UNITED STATES PATENT OFFICE.

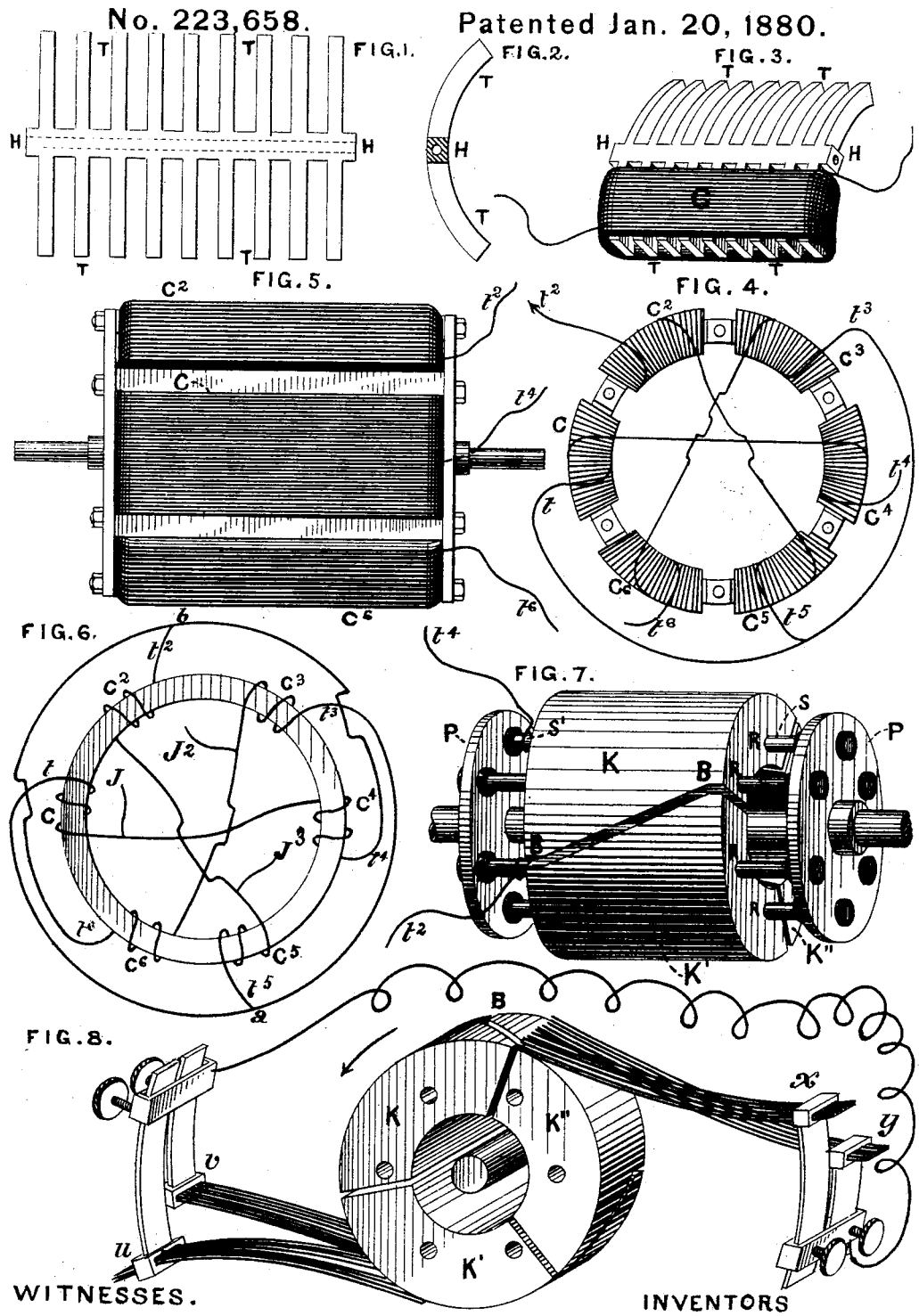

ELIHU THOMSON AND EDWIN J. HOUSTON, OF PHILADELPHIA, PA.

ARMATURE AND COMMUTATOR FOR MAGNETO-ELECTRIC MACHINES.

SPECIFICATION forming part of Letters Patent No. 223,658, dated January 20, 1880.

Application filed October 22, 1879.

*To all whom it may concern:*

Be it known that we, ELIHU THOMSON and EDWIN J. HOUSTON, both of the city and county of Philadelphia, Pennsylvania, have invented certain new and useful Improvements in Armatures for Dynamo-Electric Machines, of which the following is such a description as will enable one skilled in the art to make and use the same.

The present invention relates to further improvements in the construction and application of our invention the specification and drawings of which were filed October 4, 1879.

We construct the armature-core, as described in said specification, of a series of longitudinal ribs of iron, provided with teeth extending circumferentially from said ribs, and with the teeth of one section nearly filling the spaces between the teeth of a succeeding section.

We modify the form of armature-core sections, as hereinafter described, so as to allow their being wound separately and afterward put together and mounted on an axis.

The coils wound upon the armature are connected so as to give six corresponding ends, three of which ends, in accordance with our previous specification referred to, are connected to one another, and the remaining three to the three sections of the commutator. Any multiple of three may, of course, be employed.

The construction and mounting of the commutator we have improved so as to render it less liable to injury, and also to secure the greatest ease in its removal for cleaning and its return to its proper place in a few moments.

The application of the collecting strips or brushes to the commutator we have modified so as to admit of the current obtained from a machine running at a constant speed to be increased or diminished at pleasure without a sacrifice of efficiency in the economy of power. A machine capable of maintaining eight lights is thus decreased in capacity to seven, six, five, or four, as may be desired.

Reference is had to the figures in the accompanying drawings.

Figures 1 and 2 are views of the form given to the armature-core sections, of which there are usually six. The central rib, H, extends the length of the core, and the teeth T T are formed so as to permit the coils to be wound thereon and afterward to be put together. Fig. 3 shows an armature-core section wound with its appropriate coil C. All six sections of the core are similarly prepared before putting together. Fig. 4 shows the sections and coils in place ready to be mounted on the shaft. Fig. 5 shows the armature mounted between non-magnetic flanges or spiders placed on the shaft.

The connection of the coils is also shown in Fig. 4. Opposite coils C $C^4$ have one pair of ends connected to each other, the direction of winding being preserved, as shown. When all six coils are in like manner connected there remain six corresponding ends free, provided the direction of winding has been the same in all the coils. Of the six corresponding terminals so produced, three that are alternate—$t, t^3$, and $t^5$, Fig. 4—are permanently united, and the remaining three—$t^2, t^4, t^6$, Fig. 4—carried to the commutator.

Other equivalent connections are used when the directions of winding are not the same in all the coils.

Fig. 6 shows the manner of connecting the coils when wire of one-half the transverse section as that used in Fig. 4 is desired to subserve the same purpose. Opposite coils C $C^4$ are in this instance connected together by one terminal from each being united together, so that the direction of winding is reversed in passing across the axis. The joint so made, J, Fig. 6, has a wire soldered to it leading to one of the three sections of the commutator. The remaining coils are joined in pairs, respectively, and connected to the two remaining commutator-sections in a precisely similar manner, $J^2 J^3$. The remaining six ends, $t\ t^2\ t^3\ t^4\ t^5\ t^6$, of the coils are finally connected in two sets of three, alternate ends only being united in a set. These connections are shown at *a b*, Fig. 6.

The commutator is in principle the same as that described in our application of October 4, 1879. It consists of three segments of a ring mounted at equal distances apart around the shaft. It is made by slitting a copper ring by slots that are preferably at an oblique angle with the shaft and ring.

Fig. 7 shows the improved commutator complete. Each segment K K' of the commutator has metal rods R R (two in number) passed through it parallel to the axis, and at a convenient distance apart. Flanged plates of metal, P P, are secured upon the shaft of the machine. In each plate six holes are made at equal distances from the center, and parallel to the shaft. These holes receive the metal rods R R of the commutator-segments. Rings or buttons of vulcanite or hard wood (twelve in number) surround the extremities of the rods R, and prevent electrical contact with the plates P P. Metal sleeves S S are placed upon the rods R R, and serve to maintain the segments K K' centrally between the plates P P. Insulation from the shaft is obtained by making the diameter of the shaft considerably less than the internal diameter of the ring from which the commutator-segments were formed. The wires $t^2$ $t^4$ from the armature-coils are connected, not to the segments K K' K'', but to the metal sleeves upon the rods, as shown at S, Fig. 7. This construction, it is evident, enables the segments K K' K'' to be removed at any time without disturbing the connections to the sleeves S S, and the segments K K' K'' being completely surrounded by an air-space there is no danger from overheating or burning of the insulation, which sometimes occurs when the insulation is in direct contact, either beneath or laterally, with the segments themselves.

We have found, in practice, the commutator-insulation to remain intact under the greatest irregularities of working, such as would be immediately destructive with any other construction hitherto known. Likewise the removal and replacement of the commutator-segments can be effected in a very short time, no skill being required, as all the segments are interchangeable. The removal of the segments for cleaning occupies but a few moments.

The truing of the surfaces of the segments after wear is effected by turning, as the segments are so rigidly held that the cutting-tool cannot disturb their position.

The slot B, Fig. 7, between any two segments, K and K', is made at an oblique angle, as shown, which may be varied within certain limits. It serves to prevent uneven wear and vibration of the metal conducting-strips applied to the segments. A more complete contact with the segments is thereby afforded.

The commutator-brushes applied to the segments may be varied in width—that is, they may cover the whole or only a portion of the segments in width. The current obtained will, however, be found to vary with each change. The smaller the width of the segments covered by the collecting-brushes the less the current, and vice versa. When it is desired, however, to change the strength of current or electro-motive force of any machine, we provide a special arrangement for the purpose. Fig. 8 shows this arrangement.

Two pairs, U X and V Y, of collecting-brushes are provided, those constituting each pair being placed diametrically opposite to each other. The positions of each pair of brushes with respect to the segments is adjustable, so that the moment of passage over the slots between the segments K K' K'' may be made the same or different for both pairs of brushes.

When the brushes X Y pass the slot B, and likewise U V pass the slots together at the same instant, electro-motive force is at a minimum; but by giving an interval between the passage of each pair over the slots, as shown, the electro-motives force rises, and thus, by making a slight variation in the relative positions of the pairs of brushes, considerable changes in the electro-motive force and current occur. This feature of variability is secured without sacrifice of efficiency, being, so far as we are aware, distinctive.

We do not claim the winding of a Paccinotti or ring armature in sections, as that is a procedure well known to the art.

Our invention provides a sectional armature-core, the sections arranged consecutively on the circumference, each section being insulated from the next one succeeding without the interposition of insulating material between them. The magnetic continuity of the core is also broken at six points in the revolution, forming a discontinuous ring. The changes of magnetic polarization during revolution are consequently more sudden and violent, and a higher electro-motive force is the result than when a continuous ring is used. The coils, when placed upon the armature, constitute, when connected, in reality but a single coil having three branches, and not a continuous closed circuit, as in the Paccinotti machine.

All the similar parts of our invention we prefer to make interchangeable, so that facility of construction is secured.

We do not here broadly claim, in a set of coils on an armature, the connection together of one terminal from each coil, the other free terminals being carried to the commutator-pieces; but we do claim the connection of three free ends of six armature-coils, in accordance with the foregoing specification, irrespective of the terminals so connected being similar or dissimilar ends.

We claim as our invention—

1. In a dynamo-electric machine, a discontinuous ring-armature constructed by first placing coils of insulated wire upon the projecting teeth T T of the sections of said armature, and afterward fitting the sections together, in the manner set forth in the foregoing specification.

2. In a dynamo-electric machine, a ring-armature substantially such as described, the opposite coils of which are connected so as to leave six corresponding terminals, three of said six terminals that are alternate being permanently connected, as described, while the three remaining terminals are carried to the commutator, the whole system of coils constituting a single three-branched conductor.

3. The combination, in a dynamo-electric machine, of a discontinuous armature-core the sections of which follow one another circumferentially without electrical contact with a system of six armature-coils, constituting three pairs of opposite coils, which coils are united to form a single three-branched conductor, the three free ends of which are connected to a commutator, substantially as described.

4. In a dynamo-electric machine, a commutator the segments of which are mounted upon metallic rods, two to each segment, said rods being in turn supported in holes in metal flanges placed upon the shaft, the rods insulated from said flanges by a suitable insulator, metal sleeves placed upon said rods, to which the armature-coils are connected, the whole arranged substantially as specified, and for the purpose set forth.

5. In a dynamo-electric machine, a commutator the segments of which are surrounded on all sides by an air-space, for the purpose set forth.

6. In a dynamo-electric machine, a commutator the segments of which are mounted between metal disks or flanges and held in position at a distance from said flanges by interposed metallic sleeves S S, to some of which the armature-coil terminals are permanently attached and arranged, so as to permit the ready removal of said segments for cleaning or replacement.

7. In a dynamo-electric machine, the combination, with a commutator consisting of three insulated segments, of four or more collecting-brushes, constituting two or more pairs of diametrically-opposite brushes, each pair being adjustable with respect to said commutator-segments, to be used for the purpose of varying the electro-motive force of the machine, substantially as set forth.

ELIHU THOMSON.
EDWIN J. HOUSTON.

Witnesses:
D. W. HOWARD,
GEO. W. SCHOCK.